Patented June 19, 1923.

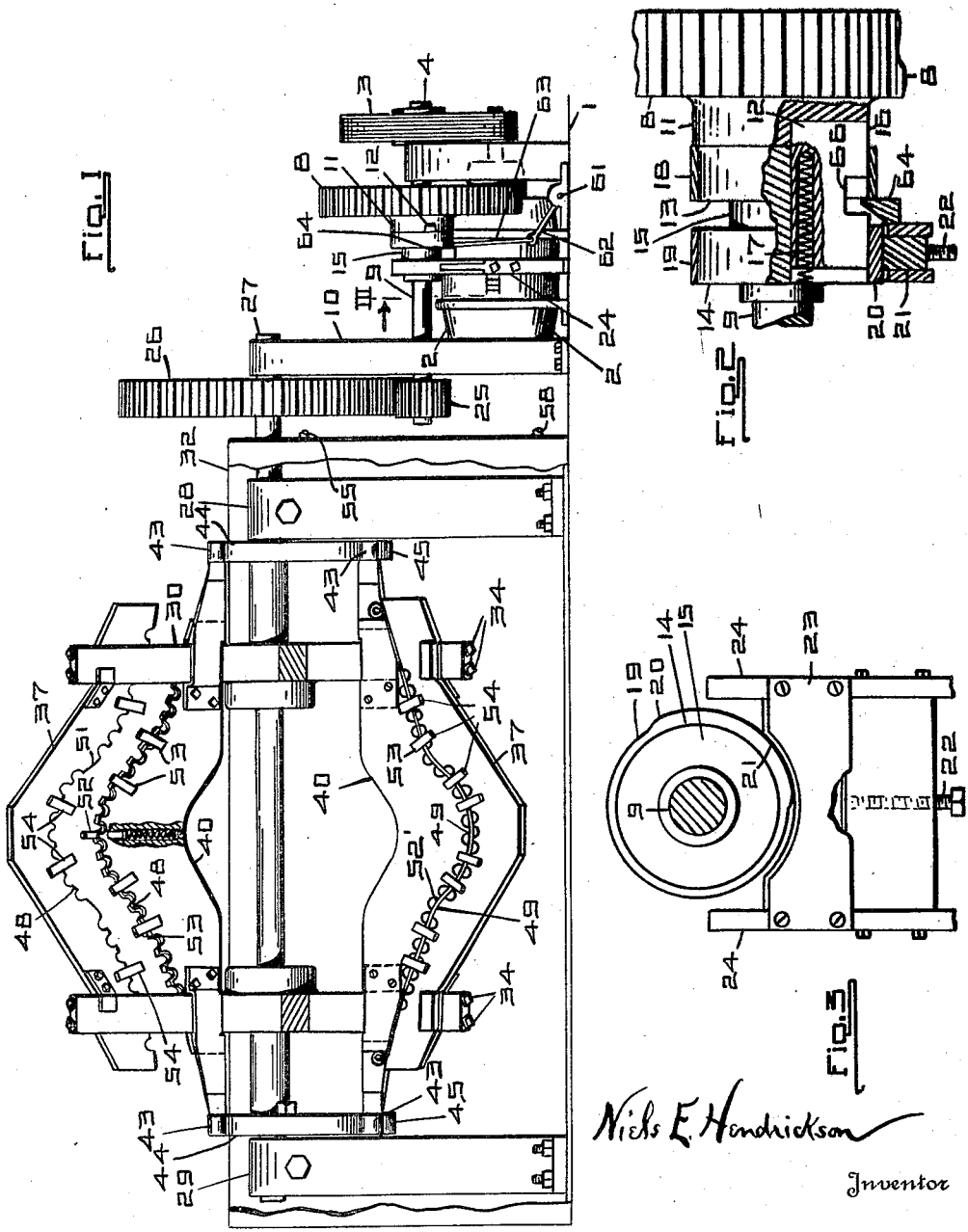

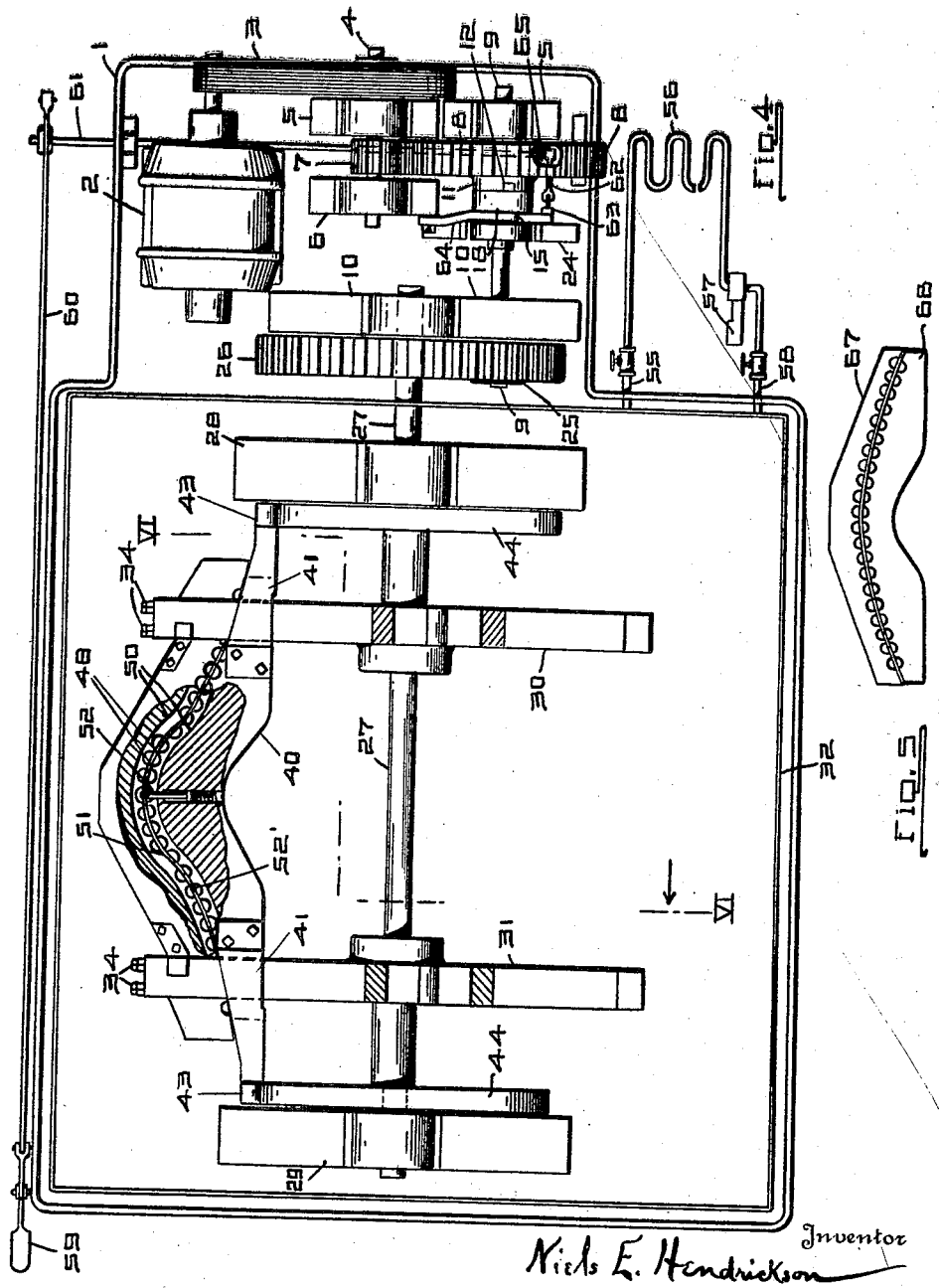

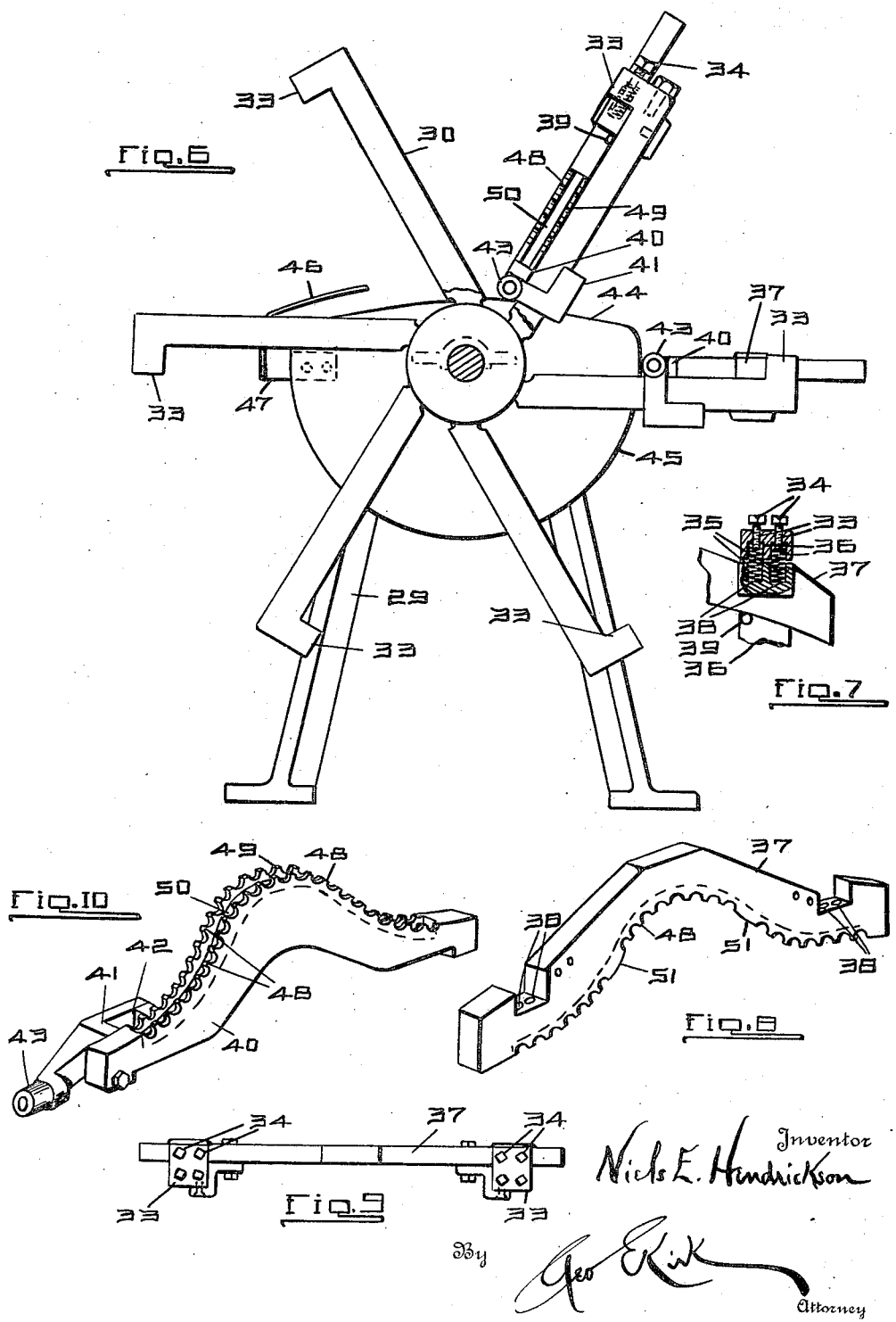

1,459,208

UNITED STATES PATENT OFFICE.

NIELS E. HENDRICKSON, OF TOLEDO, OHIO, ASSIGNOR TO THE MATHER SPRING CO., OF TOLEDO, OHIO, A CORPORATION OF OHIO.

SPRING MANUFACTURE.

Application filed August 2, 1919. Serial No. 314,870.

*To all whom it may concern:*

Be it known that I, NIELS E. HENDRICKSON, a citizen of the United States of America, residing at Toledo, Lucas County, Ohio, have invented new and useful Spring Manufacture, of which the following is a specification.

This invention relates to the manufacture of springs.

This invention has utility when incorporated in a machine for forming and quenching spring leaves.

Referring to the drawings:

Fig. 1 is a side elevation of an embodiment of the invention, parts being broken away;

Fig. 2 is a fragmentary detail of the driving clutch;

Fig. 3 is a section of a line III—III, Fig. 1, showing the brake device;

Fig. 4 is a plan view with parts broken away of the machine of Fig. 1;

Fig. 5 is a detail in side elevation of a pair of dies in position for forming a leaf of a semi-elliptic spring;

Fig. 6 is a section of the line VI—VI, Fig. 4, looking in the direction of the arrow;

Fig. 7 is a fragmentary detail of the yieldable mounting for the outer forming dies;

Fig. 8 is a perspective view of an outer forming die;

Fig. 9 is a plan view of an outer forming die as yieldably mounted on the carrier; and Fig. 10 is a perspective view of an inner forming die.

Mounted on the base 1 is motor 2 having silent chain 3 extending therefrom for driving shaft 4, mounted in bearings 5, 6, carried by the base 1. Fixedly mounted on this shaft 4 is a pinion 7 in mesh with a gear wheel 8 which has axially protruding therefrom a boss 11 having a recess 12 therein. Mounted on this shaft 9, adjacent the gear 8 and fixed with the shaft 9 as integral therewith are collars 13, 14, (Fig. 2) providing therebetween a groove 15. These collars 13, 14, as well as the shaft 9, provide a way for a clutch block 16 having a compression helical spring 17 therein, normally tending to thrust this block 16 into the recess 12 to effect driving of the shaft 9 from the gear 8.

The block 16 is maintained in position in the collars 13, 14, by bands 18, 19. The band 19 has an enlarged brake section 20 (Fig. 3) which in the rotation of the shaft 9, as approaching stop position for declutching, engages a fixed friction block or brake 21 of wood and adjustable by set screw 22 to take up wear. This friction brake block 21 is mounted between guide plates 23 carried by uprights 24 mounted on the base 1.

Carried by the shaft 9 beyond the bearing 10 is pinion 25 in mesh with gear wheel 26 fast on shaft 27, carried by bearings 10, 28, 29. Six rotations of the pinion 25 will effect one rotation of the gear 26. This shaft 27 extends above the base 1 to serve as a carrier for arms 30, 31, opposing each other in annular series to be moved into and out of a vat 32 between the bearings 28, 29.

Arms 30 are respectively parallel with arms 31 to provide, in this instance, six pairs of die carriers. The die carrier arms are laterally offset in advance of a radius and terminally offset to provide in a radial line an abutment 33. In each abutment 33 (Fig. 7), may be mounted a pair of adjustable screws 34 for regulating the compression of helical springs 35 in seats 36 of the abutments 33 to provide yieldable mounting means for outer die members 37 having seats 38 therefor. The inward travels of these die members 37 are limited by set screws 39 in the carrier arms.

Opposing each outer die member 37 is an inner die member 40, each end herein shown provided with a bracket 41 as a guide embracing the carrier arms for holding the member 40 in position for true radial travel as guided by ways 42. These brackets 41 terminally carry rollers 43 normally acting by gravity to ride upon short upper radius portion 44, of fixed cams carried by the bearing brackets 28, 29. These inner die members 40 are positively moved outward during the carrier rotation to travel on long radius portion 45 of said cams when the carrier is moving clockwise (Fig. 6) downward into the vat 32. In emerging from the vat 32 leaf member 46 may coact with the roller 43 to pull the inner die member 40 inward to ride upon the short radius portion 44 of the fixed cam, should there be any tendency against it freely falling by gravity to ride upon the cam portion 44. This guide leaf 46 is mounted by a clip 47 in fixed position as to the cam 44, 45.

There is accordingly herein provided an annular series of six pairs of spring forming dies, the outer member of each pair being yieldably mounted on the carriers while the inner member is operable for positive actuation along the carriers, radially. The carrier arms 30, 31, thus serve as guides for the slight yielding movement of the outer die members 37 as well as for the forming travel of the inner die members 40. In practice the resistance to compression of the springs 35 is such that whatever movement may occur of the outer die member 37 as to the carrier arms on which it is mounted is really only a movement of a most minor extent to permit this machine to adapt itself to the slight variations which may occur in the material being worked up into the spring leaves.

The dies 37, 40, in this instance are shown as adapted to the production of a double curve type of leaf spring. Each die member is shown as comprising a longitudinally extending series of forming faces 48 along one side thereof opposed by a similar longitudinally extending series of forming faces 49, thereby providing therebetween a longitudinally extending groove 50. In instances of compound curve formation of spring leaves, it may be desirable so to configure the forming faces adjacent the reverse curve region as to avoid abrading the leaf when forcing it to form as herein shown. This end is attained by a forming face 51. While these forming faces in their action are effective in bringing and holding the leaf in the ultimate form, their spaced relation is of marked utility in permitting exposure of the surfaces of the spring leaf to the quenching liquid.

Yieldable outwardly thrust guide pin 52 carried by each inner die member 40 enters central bolt hole in the spring leaf which as a red hot piece of metal 52' is placed in position on the inner die member 40 at the upper right hand region of Fig. 6. Staggered laterally clips 53, 54, on the die members 40, 37, tend to wedge and straighten any distortions of the leaf laterally as the pair of die members move relatively outward which travel is effected by the roller 43 moving along the portion 44 to the maximum radius portion 45 of the cam 44, 45.

When the pair of dies 40, 37, is in horizontal position, the movement of the dies to forming position has been completed and the further travel is into the oil in the tank or vat 32. Of course the temperatures for operation may vary with the character of the material. However, for chrome vanadium steel the heat for forming may run in the region of 1500° of 1600° F., while the temperature of the oil in the vat 32 for quenching may be down as low as 150° F. The keeping of the oil in the vat to the desired temperature may be effected through a circulating system as by pipe 55 connected to a cooling coil 56 and thence back by way of circulation effecting pump 57 and line 58 to the vat 32.

In the operation of the device the attendant placing the spring leaf 52' on the bolt or pin 52 may, as soon as said leaf is in position, depress pedal 59 which may operate through link 60, rock shaft 61, arm 62, and link 63, to swing a wedge member 64 downward and out of the groove 15 between the collars 13, 14. This allows the block 16 as thrust by the spring 17 to engage in the recess 12 of the continuously running gear wheel 8. Accordingly, the shaft 9 is started to rotate, but it effects only one rotation, as the operation at the pedal 59 is merely a kick-off and at once shaft 9 starts to rotate the wedge member 64 is thrown by torsion spring 65, about the rock shaft 61, into the groove 15, so that as the shaft 9 tends to complete its first rotation, this wedge member 64 enters notch 66 in the clutch block 16 and wedges such block against action of spring 17 out of the recess 12. This allows the motor 2 to drive the gear 8 idly, while simultaneously with this declutching, the brake face 20 frictionally engages the brake shoe 21 stopping the shaft 9 with the shaft 27 rotated but 60°, or in position for the attendant to place a spring leaf 52' in position on a pin 52 in between the next pair of opposing dies mounted by the carrier. This intermittent operation, as manually controlled, is in practice a handling of the spring leaves at approximately a uniform rate. With the temperature of the oil in the vat 32 maintained constant and the time for submerging the spring leaves in the oil vat resulting in a uniform quenching in bringing the hot formed spring leaves down to the temperature of the oil, there is practically no departure in the character of the springs, one from the other, herein produced. This uniformity in treatment means a uniform product. The leaves are thus interchangeable for similar assembly in different springs—a feature of commercial value. The spring leaves are as to each other true to form as forced into shape by the relatively rigid and herein shown integral forming faces of the dies. They are as to each other of similar hardness. This uniform condition of hardness is not merely superficial, but the hardness approximates uniformity throughout the structure of the leaf. The leaf is held to shape, but the contact areas of the forming faces in reality amount to but a minor proportion of the spring leaf area. In fact, as herein shown, the contact faces approximate only 15% of the flat area of the leaf, leaving 85% of this surface fully exposed to the action of the oil, besides having both edges totally exposed to the oil action and are so distributed that the oil treatment is not isolated from such regions of face contact. The quenching is effective throughout the entire spring. This is evidenced by the uniformity of Brinell tests on spring leaves made on this machine. For instance, a good range of Brinell hardness for chrome vanadium steel is 415 to 460. Below 415 is too soft; above 460 is too hard. Repeated tests have been made at spaced points along various regions on these springs made on this machine showing minimum Brinell hardness of 418 and maximum hardness of 444, the average running about 430. This is practical evidence of the high character of output which may be readily produced by the machine of this disclosure with a high output rate using unskilled labor.

The machine is positive in its relation between the forming faces of a die member. This is a feature of simplicity in construction contributing to interchangeable product. The yield for the die members is just sufficient to take undue strains off the machine. The leaf as formed hot is held to such form throughout the quenching with effective quenching in no wise disturbed by the holding. The rigidity of the machine permits forcing the spring blank to form at the low forming temperature, so there is no coarseness of grain or objectionable crystallization from high heating. The desired toughness with fine grain is definitely attained uniformly with identical spring leaves produced at a rapid rate. In the formation of simple semielliptic springs, dies 67, 68, (Fig. 5) may be used.

What is claimed and it is desired to secure by Letters Patent is:—

1. A spring forming machine comprising a first annular series of dies, an opposing second concentric annular series of dies, disposed in radial relation as to the first series each die of an inner series being radially opposed by a die of an outer series, a carrier for the dies, a vat, driving means for shifting the carrier to successively submerge the dies in the vat, and fixed means coacting with the dies of one series during said travel of the carrier for effecting movement thereof toward the opposing dies in forming a spring therebetween.

2. A spring forming machine comprising a first annular series of dies, an opposing second concentric annular series of dies, the dies of the two series being arranged in pairs, each die of an inner series being radially opposed by a die of an outer series, a carrier providing radial guide means for the dies of one series to permit movement of one die of each pair toward its opposing die, a vat, driving means for shifting the carrier during carrier travel to submerge the dies in the vat, and control means coacting to actuate the movable dies into forming relation before submergence.

3. A spring forming machine comprising an outer annular series of dies, an opposing inner annular series of relatively movable dies, each die of an inner series being radially opposed by a die of an outer series, a carrier providing radial guide means for the inner dies and mounting means for the outer dies, a vat, driving means for shifting the carrier to submerge the dies in the vat, and a stationary cam for actuating the inner dies during carrier shifting.

4. A spring forming machine comprising inner and outer concentric annular series of dies arranged in opposing pairs, each die of an inner series being radially opposed by a die of an outer series, a carrier providing radial guide means for one series of dies and yieldable mounting means for the other series of dies, a vat, and driving means for shifting the carrier to move the dies into the vat.

5. A spring forming machine comprising an outer annular series of dies, a carrier, means for yieldably mounting the dies on the carrier, said carrier providing a radially extending guideway as to each yieldable die, an inner annular series of dies, a fixed cam, rollers carried by the inner dies for coacting with the cam, and driving means for shifting the carrier for effecting actuation of the inner dies.

6. A spring forming machine comprising a carrier having a shaft, a plurality of arms extending from the shaft and terminating at their free ends in overhanging portions, spring forming dies extending axially of the shaft, said dies medially of their extent being more remote from the shaft, and terminally held by the arms to face radially toward the shaft from the overhanging portions of the arms, for each rigid die a movable spring forming die medially of such latter die extent along the shaft more remote from the shaft, and mounting means for guiding the movable dies for sliding along the arms toward and from the fixed dies.

7. A spring forming machine comprising a carrier having a shaft, a plurality of arms extending from the shaft and terminating at their free ends in overhanging portions, spring forming dies extending axially of the shaft and terminally held by the arms to face radially toward the shaft from the overhanging portions of the arms, a movable spring forming die disposed radially inward from each rigid die, mounting means for guiding the movable dies for sliding along the arms toward and from the fixed dies, and stationary cams for controlling the sliding travel of the movable dies during the rotation of the shaft.

In witness whereof I affix my signature.

NIELS E. HENDRICKSON.

Certificate of Correction.

It is hereby certified that in Letters Patent No. 1,459,208, granted June 19, 1923, upon the application of Niels E. Hendrickson, of Toledo, Ohio, for an improvement in "Spring Manufacture," errors appear in the printed specification requiring correction as follows: Page 3, line 62, claim 2, strike out the phrase "during carrier travel" and insert the same to follow the word "coacting" in line 64; same page, line 93, claim 5, after the word and comma "dies," insert the words *each die of an inner series being radially opposed by a die of an outer series;* and that the said Letters Patent should be read with these corrections therein that the same may conform to the record of the case in the Patent Office.

Signed and sealed this 17th day of July, A. D., 1923.

[SEAL.]

WM. A. KINNAN,
*Acting Commissioner of Patents.*